Jan. 10, 1939.                H. L. SPAUNBURG                2,143,584
                                COUNTING DEVICE
                              Filed Jan. 7, 1936                3 Sheets—Sheet 2

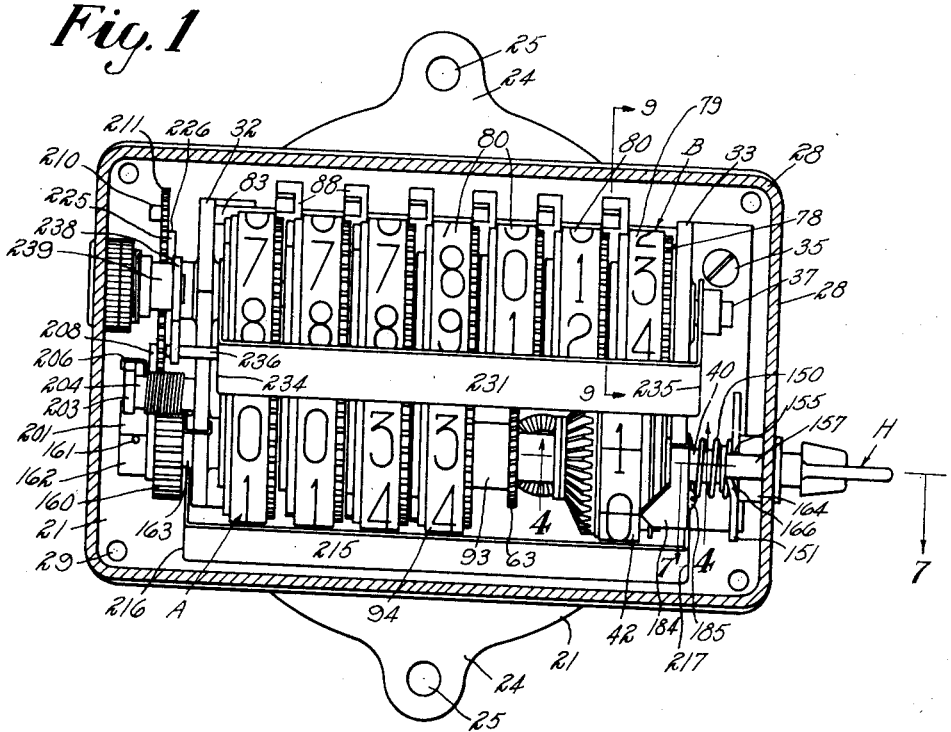

Inventor
Harvey L. Spaunburg

By  W. Clay Lindsey
                        Attorney

Jan. 10, 1939.  H. L. SPAUNBURG  2,143,584
COUNTING DEVICE
Filed Jan. 7, 1936   3 Sheets-Sheet 3
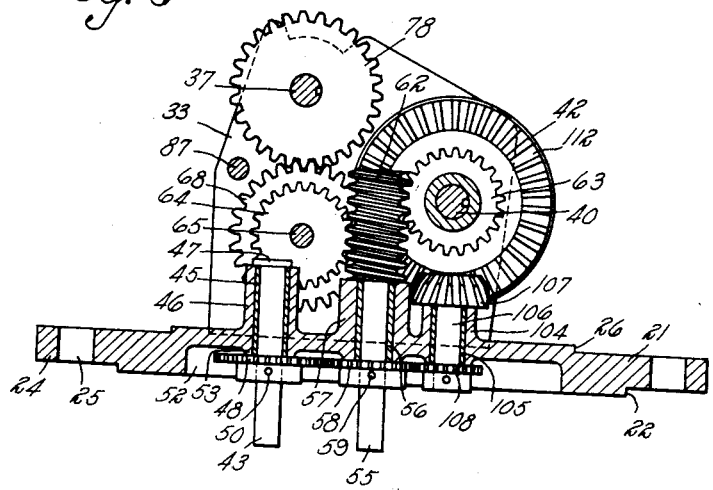
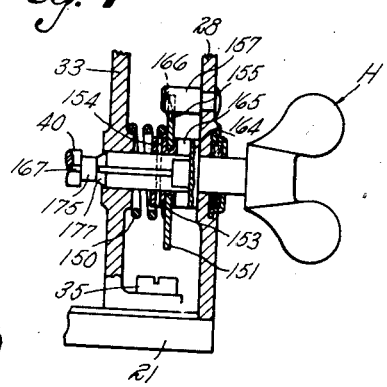
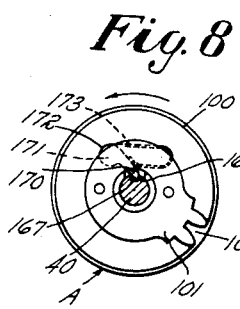
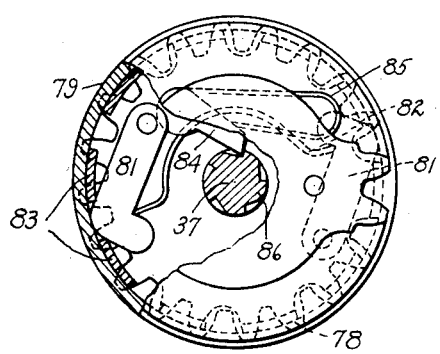
Inventor
Harvey L. Spaunburg
By W. Clay Lindsey
Attorney Patented Jan. 10, 1939

2,143,584

UNITED STATES PATENT OFFICE 2,143,584

COUNTING DEVICE

Harvey L. Spaunburg, Bristol, Conn., assignor to Veeder-Root, Incorporated, Hartford, Conn., a corporation of Connecticut Application January 7, 1936, Serial No. 57,893

17 Claims. (Cl. 235—144)

This invention relates to counting devices and, more particularly, to a counter mechanism having a plurality of count or numeral wheels and means for resetting the same to initial zero positions. As one example of a use to which the improvements of the present invention may be applied, reference may be had to a counter mechanism arranged for registering the number of gallons of gasoline dispensed from a gasoline delivery truck, it being understood that my improvements are not limited to a counting mechanism employed for that particular purpose.

An aim of this invention is to provide an improved and simplified construction wherein the count or numeral wheels may be reset to zero without introducing any errors in the registering operations due to backlash or lost motion.

A further object of my invention is to provide a counting mechanism adapted to be associated with a liquid dispensing apparatus on a delivery truck and having a series of numeral wheels arranged to register the number of gallons dispensed on each delivery and a test or check wheel of lower order than the first wheel of said series and driven in a predetermined rotational relation therewith in a direction opposite thereto, there also being means for resetting said wheels without resulting in any lost motion or backlash.

A still further aim of my invention is to provide a counting mechanism including a test or check wheel driven in a predetermined rotational relation to a series of registering wheels, the test wheel having various features of novelty and advantage, it being particularly characterized by its simplicity in construction and effectiveness in operation.

To the accomplishments of these and other objects which will be apparent to those skilled in the art from the ensuing description of my invention and the claims appended hereto, the present invention provides a novel type of counting mechanism including a checking wheel wherein a manually operable resetting device which is normally secured in a locked inoperative position, may be employed to reset a plurality of count wheels and the checking wheel to a desired initial zero position and at the same time to avoid or prevent all backlash and loose interconnection of operative parts so that each minute initial operation of the driving mechanism will accurately register on the count wheels and check wheel. This invention further contemplates a second counting device which is arranged to accurately register the total accumulated count of the resettable counting mechanism.

Referring to the drawings wherein I have illustrated the preferred embodiment of my invention, and wherein like numerals indicate like parts:

Figure 1 is a plan view of my invention with the cover broken away to better disclose the operative parts therebeneath and with the resetting mechanism locked in inoperative position;

Fig. 2 is a left-hand end view of the parts shown in Fig. 1 with the cover broken away;

Fig. 6 is a stepped sectional view taken substantially along the line 6—6 of Fig. 3 and showing various parts of the driving mechanism in the same plane for convenience of illustration;

Fig. 7 is an enlarged fragmentary sectional view taken substantially along the line 7—7 of Fig. 1;

Fig. 8 is a view taken along line 8—8 of Fig. 3; and

Fig. 9 is an enlarged fragmentary view taken substantially along the line 9—9 of Fig. 1.

Figure 3:
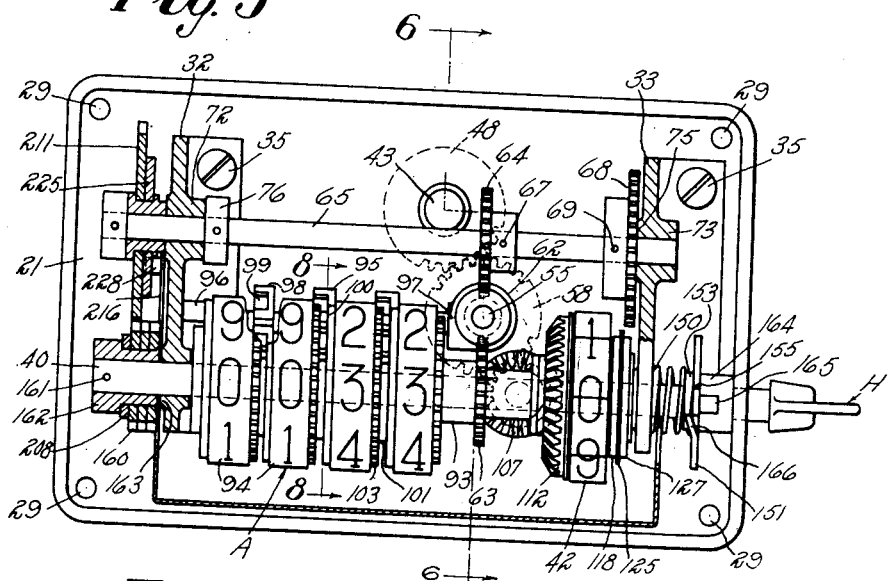
Fig. 3 is a fragmentary plan view of my counting mechanism with the totalizer register removed and the parts of the resetting mechanism in initial operative resetting positions.

As illustrated, my preferred type of invention may comprise a base 21 of any suitable size and shape to properly support the various parts of my mechanism and which, in the present instance, is substantially rectangular and has a downwardly projecting cylindrical flange 22 adapted to aid in positioning it on any suitable support (not shown). The base is provided with two transversely projecting ears 24 having holes 25 therethrough whereby it may be rigidly secured as by bolts or other means to a support. The top of the base has an upwardly extending peripheral flange 26 engageable with a suitable protecting cover 28 encasing the counting mechanism and removably secured in position as by bolts passing through holes 29.

In order to support the various parts of my mechanism, I have provided a pair of upwardly projecting spaced brackets 32 and 33, each of which is secured relatively near the end of the base and to the top face thereof by a laterally projecting foot fastened in position by screws 35. For convenience of manufacture, these brackets may be substantially duplicate in construction so that they may be interchangeably positioned. Rigidly secured in the upper portion of said brackets and extending therebetween, I provide a shaft 37 adapted to support a plurality of count wheels forming a totalizer register B, and a shaft 40 preferably rotatably journalled within a lower portion at the forward end of said brackets supports a plurality of similar count wheels which together provide a resettable register A adapted to be manually reset to initial zero positions whenever desired by means of a reset handle H. Shaft 40 further supports a check wheel 42 adapted to be simultaneously operated by the driving mechanism and to serve the dual purpose of a tenths unit wheel and a means whereby the accuracy of operation of my device may be checked.

The check wheel, resettable register A, and totalizer B are simultaneously operated by a driving mechanism which, in the present instance, may comprise a vertical drive shaft 43 journalled within a bushing 45 which is mounted in a vertically disposed boss 46 on base 21. The upper end of drive shaft 43 terminates in a head 47, and a gear 48, secured on shaft 43 by a pin 50 for integral rotation therewith, is located within a recessed portion 52 in the bottom of the base and in engagement with a downwardly projecting boss 53 which aids in axially positioning shaft 43 and gear 48. An alternative drive shaft 55 also projects vertically through the base and is journalled within a bushing 56 secured in an upwardly projecting boss 57. Shaft 55 is provided with a gear 58 at its lower end secured in position by a pin 59. Gear 58 is identical with gear 48, and shaft 55 is so positioned with relation to shaft 43 that gears 48 and 58 are in constant enmeshed relation. The upper end of shaft 55 has a worm 62 integral therewith to simultaneously transmit rotative movement to the various registering devices. In the present instance, the registering count wheels are designed to be rotated in a clockwise direction, as viewed from the right-hand or handle end of Figs. 1 and 3, and the check wheel is simultaneously driven in a counter-clockwise direction.

My device may be connected to any suitable source of rotative power which is either clockwise or counterclockwise to cause the desired clockwise registration of the count wheels. To accomplish this, the source of driving power is connected to either shaft 43 or shaft 55, as may be required, and the remaining shaft portion which projects below one of the gears 48 or 58, as the case may be, is cut off in the event that it interferes with the driving mechanism. If a clockwise rotation is transmitted directly to shaft 55, the worm 62 will rotate simultaneously therewith in the same direction. However, if a reversed or counter-clockwise rotation is transmitted to shaft 43, said rotation will be transmitted through the duplicate enmeshed gears 48 and 58 to rotate worm 62 in a clockwise direction and at the same rate of speed.

Worm 62 is simultaneously enmeshed with a worm wheel 63 mounted for free rotation on shaft 40, and with a worm wheel 64 secured to a jack shaft 65, as by a pin 67, to transmit rotation thereto. A gear 68 also supported on shaft 65 adjacent to bracket 33 is arranged for integral rotation with said shaft by means of a pin 69. The jack shaft is journalled for free rotation in the respective hubs 72 and 73 of brackets 32 and 33. An inwardly projecting boss 75 on bracket 33 engages gear 68, and hub 72 engages a locking collar 76 to axially locate shaft 65 relative to brackets 32 and 33 and prevent gears 64 and 68 from axial movement.

Gear 68 is enmeshed with a gear 78 journalled for free rotation in one direction on shaft 37 which supports the count wheels of the totalizer B and is arranged to transmit rotation to the totalizer in the usual manner as commonly employed in counting devices. To accomplish this, I have provided a plurality of cylindrical count wheels 79 and 80 mounted on shaft 37 and which are provided with numerals on their peripheral faces running from "0" to "9" in consecutive evenly spaced relation. Count wheels 80 are each integrally secured to their respective driving gears, and the count wheel 79 is arranged for only one way rotation whereby reversed registration cannot be imparted to the totalizer register B. As shown in Fig. 9, gear 78 pivotally supports two pawls 81 which are resiliently urged by a spring 82 into engagement between peripherally spaced teeth 83 within wheel 79 in such manner that a forward rotation of gear 78 will cause the pawls to lock between the teeth and impart a forward registering rotation to wheel 79. Any backward movement imparted to gear 78 will cause pawls 81 to spring inwardly and slide over teeth 83 without imparting rotation to wheel 79. The count wheel 79 is further provided with a pivotally supported inwardly projecting pawl 84 which is urged by a spring 85 into ratchet engagement with peripherally spaced teeth 86 in the nonrotatable shaft 37 whereby wheel 79 is free to be driven in a forward registration, but is prevented from backward movement by the locking engagement of pawl 84 with one of the teeth 86. A suitable well-known transfer mechanism including an intermediate shaft 87 and pinions 88 journalled thereon interconnects the adjacent count wheels. This transfer mechanism is similar to that of the register A, now to be described.

Referring in detail to the resettable register A, the worm wheel 63 rotatable on shaft 40 is provided with a hub 93 which is suitably secured at its left-hand end to a count wheel 94 of the same general construction as count wheel 79 employed in my totalizer B. My resettable count wheel arrangement may be of any suitable type and preferably comprises a plurality of adjacent count wheels 94 which are coaxially mounted on reset shaft 40 and are of substantially duplicate construction having uniformly spaced consecutive numerals from "0" to "9" on their peripheral faces. These count wheels are arranged for clockwise rotation and interconnected by a suitable transfer mechanism to cause them to register a consecutive counting in a desired manner.

In the present instance, for illustrative purposes, I have shown each transferring means in accordance with a well-known construction, such, for example, as disclosed in the United States patent to Orme No. 368,163 issued August 9, 1887. As illustrated in my present embodiment, a plurality of transfer pinions 95 are each journalled for free rotation on an intermediate shaft 96 disposed parallel to shaft 40 and supported by bracket 32 at one end and at the other end by a boss 97 projecting from the top of the base 21. Each of the transfer pinions 95 is provided with wide teeth 98 and alternately disposed narrow teeth 99, and the pinions are so located that they are each aligned between a pair of count wheels, as shown, and in such manner that a rotary movement of one count wheel may be periodically transferred to cause a predetermined registration of the next wheel of higher order.

As is common in constructions of this type, each count wheel, as viewed in Fig. 3, is arranged to rotate through a complete revolution to register a tenth revolution on the adjacent wheel to the left thereof and of higher order. On the wheel of lower order I have provided a concentric locking surface 100 and a plate 101, and this surface and plate has a notch 102 adapted to periodically engage only the wide teeth of pinion 95 and transmit a partial rotational movement to the next counting wheel of higher order. Each count wheel is provided with a gear 103 secured to the right-hand side thereof and arranged to be constantly enmeshed with both the wide and narrow teeth of the transfer pinions. These gears 103 are preferably ratchet connected to their respective count wheels 94 in the same manner as previously described with reference to count wheel 79 to prevent the possibility of backward operative registration of wheels 94 and also to permit said wheels to be reset to respective zero positions, as will be later described. It will be noted that with such a construction each complete rotational movement of a wheel of lower order will cause a tenth rotational movement of the next wheel of higher order. Except at such times as when the transferring operation is taking place, the wide pinion teeth 98 will slidably bear against the locking face 100 so that accidental rotation of the transfer pinions and wheels of lower order is prevented. Hence, it will thus be appreciated that any rotation transmitted to shaft 55 from a suitable source will serve to cause worm 62 to rotate therewith and simultaneously transmit a rotary movement to the registers A and B through the instrumentalities of gears 63, 64, 68 and 78. Gears 64, 68, and 78 are of such size and relation to each other that the count wheels of lowest order in registers A and B will be simultaneously rotated at the same angular rate to accurately register in conjunction with each other.

Figure 4:
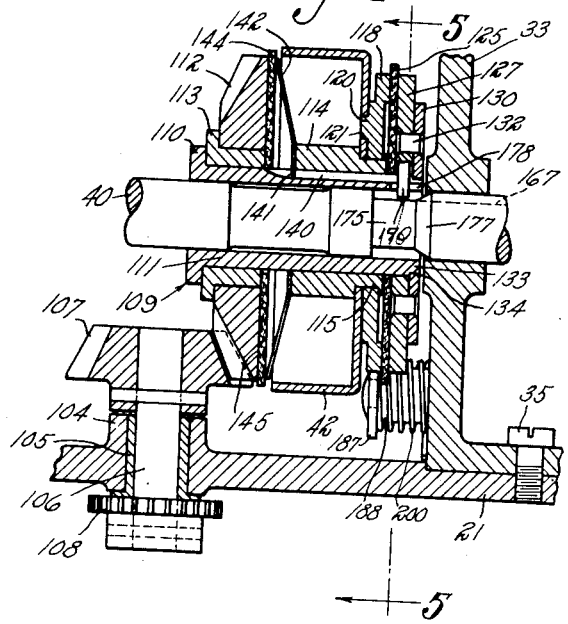
Fig. 4 is an enlarged sectional view taken substantially along the lines 4—4 of Fig. 1 and showing the check wheel and operative parts associated therewith.

My invention further provides a convenient means whereby the check wheel 42 may be rotated in predetermined cyclic relation to the register A in such manner that it will make a complete counter-clockwise rotation for each tenth clockwise rotation of the counting wheel 94 of lowest order in register A. To accomplish this, base 21 is provided with an upstanding hub 104 having a vertically extending bushing 105 therein arranged to rotatably receive a vertical shaft 106 having a bevelled gear 107 secured to its upper end and a pinion 108 secured to its lower end in enmeshed relation with gear 58. As shown in Fig. 4, the right-hand end of shaft 40 has an elongated bushing 109 journalled for free rotation thereon and having an upwardly projecting annular end flange 110 and a cylindrical body portion 111. A bevelled gear 112 having a supporting bushing 113 is journalled on the body portion 111 adjacent to flange 110 for free rotation thereon and in enmeshed relation with bevelled gear 107. Adjacent to gear 112 I have further provided a sleeve member 114 slidably journalled for free rotation on body portion 111 of said sleeve and having a reduced concentric cylindrical end portion 115 upon which is secured the check wheel 42 for integral rotation therewith.

To aid in integrally fastening check wheel 42 to sleeve 114, the reduced portion 115 has a clutch plate 118 pressed thereon and rigidly secured in position by heading over the rearward end of sleeve 114 as illustrated in Fig. 4. Plate 118 is preferably secured to check wheel 42 by means of a projecting portion 120 thereon received within an aligned hole 121 in the side face of said wheel. Hence, it will be appreciated that any rotary movement transmitted to sleeve 114 will serve to cause a corresponding rotation of check wheel 42 and clutch plate 118.

Clutch plate 118 is frictionally and laterally engaged by a disk-like clutch facing 125 rigidly secured in any suitable manner, as by cement, to a clutch driving plate 127 which is substantially cylindrical in form and fixedly secured upon the cylindrical body portion 111 of bushing 109 for rotation therewith. To aid in securing plate 127 in position, I provide a supporting plate 130 fastened thereto by spaced rivets 132 and axially fixed within a peripherally reduced portion 133 at the end of bushing 109 by means of peening over the end of said bushing at 134 as shown. Hence, it will be appreciated that plate 130 is rigidly fastened within a peripheral groove at the right-hand end of bushing 109 and thereby secures clutch driving plate 127 for integral rotation with said bushing. Clutch plate 127 may further be interlocked for rotation with reset shaft 40 as will be later described in this case. The peripheral face of body portion 111 is also provided with a longitudinally extending keyway 140 arranged to receive an inwardly extending portion 141 of a substantially dish-shaped spring 142 having a central hole therethrough adapted to slidably receive body portion 111. The inner portion of spring 142 is provided with a substantially flat annular face adapted to resiliently and frictionally bear against the left-hand end of sleeve 114, and the outer peripheral edge of said spring resiliently engages a suitably disk-shaped flat clutch facing 144 secured to the flat face 145 of bevelled gear 112. In view of the fact that the spring 142 is mounted under resilient compression between clutch facing 144 and the end of sleeve member 114, it will be appreciated that any rotary movement transmitted to gear 108 by the driving mechanism will serve to transmit a corresponding rotary movement to check wheel 42 through bevelled gears 107 and 112, facing 144, spring 142, bushing 109, plate 130, and clutch members 127, 125, and 118. Hence, any rotary movement transmitted to drive worm 62 will result in a simultaneous registration of check wheel 42 and counters A and B. Check wheel 42 is preferably so constructed that it must be rotated counter-clockwise, as viewed from the handle end of my counting device, to cause a clockwise registration of the other count wheels. Hence, it will be noted that a counter-clockwise rotation or reversed rotation will be imparted to the check wheel 42 during the operation of my counting device. Consequently, my check wheel, which also serves as a tenths unit wheel, is provided with spaced consecutive registering numerals running from "0" to "9" in reversed order from that of the other count wheels. The reasons for a reversed rotation of my check wheel will be explained later in this case.

The reset mechanism, as operated by handle H, is normally restrained from rotative operative engagement with the check wheel 42 and count wheels 94 by means of a spring 150 slidably mounted on the right-hand end of shaft 40 and in resilient compressed engagement between bracket 33 and a disk-shaped locking plate 151 having a hub portion 153 locked on shaft 40 by a transverse pin 154 passing through said members. Locking plate 151 is provided with a recessed or arcuate cut out portion 155 adapted to axially and slidably engage with a pin 157 laterally projecting from and integrally secured to the right-hand inner end of cover 28 as shown in Fig. 1. Spring 150 normally tends to axially slide shaft 40 towards the right to the position shown in Fig. 1, thereby causing recessed portion 155 to normally slidably engage with pin 157 and consequently lock shaft 40 against rotation. The left-hand end of shaft 40 has a gear 160 fastened thereon by means of a pin 161 passing transversely through a projecting hub portion 162 and shaft 40. Due to the resiliency of spring 150, the gear is normally maintained in abutting engagement with a hub 163 on bracket 32. In the present instance, gear 160 is illustrated as a plurality of adjacent pinions riveted on the hub member 162 secured to shaft 40, but it will be appreciated that the pinions and hub may be constructed as an integral member if desired.

To facilitate removal of the cover 28 from the base 21, handle H is secured to a short shaft journalled in the cover in axial alignment with but removably engageable with reset shaft 40. As illustrated in Fig. 3, the inner end of said short shaft is provided with an enlarged head 164 having a slot 165 extending transversely therethrough and slidably engageable with a flattened portion on the end of shaft 40. This flattened portion lies in diametrical alignment with recessed portion 155 and in a substantially vertical position when the resetting mechanism is in an inoperative position. Hence, the cover 28 may be easily removed at this time since pin 157 will lift from recession 155 and head 164 will vertically slide from engagement with the flattened end of shaft 40.

The reset shaft 40 is provided with a groove 167 extending longitudinally thereof and substantially throughout its entire length. This groove is provided with a side face or shoulder 168 arranged to engage a plurality of ratchet pawls similar to the pawl 84 in count wheel 79 and supported in the same manner by the check wheel and each of the reset counter wheels so that during the clockwise rotational movement of shaft 40 as viewed in Fig. 5, the pawls will drop into groove 167 and be positively engaged with shoulder 168 to positively rotate said wheels in a clockwise direction to initial zero starting positions.

Figure 5:
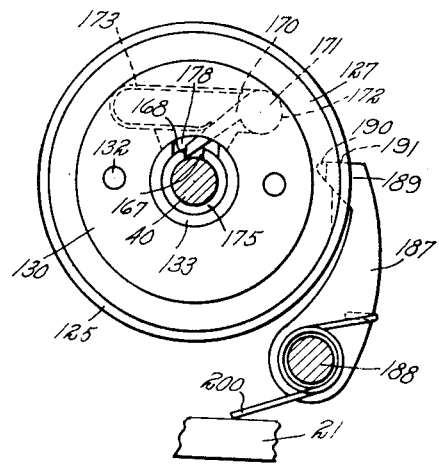
Fig. 5 is an enlarged fragmentary view taken along the line 5—5 of Fig. 4.

Referring more particularly to the construction of the ratchet mechanism, I have illustrated in Figs. 5 and 8 my preferred type of reset pawl mechanism mounted in clutch plate 127 in the check wheel and in each supporting flange of wheels 94. As herein shown, plate 127 and each supporting flange of the reset wheels 94 is provided with a laterally recessed cavity within which is secured a pawl 170 having a substantially circular end portion 171 arranged for pivotal movement within a cavity 172 and urged into operative engagement with slot 167 and shoulder 168 by a spring member 173 mounted within said cavity. During normal operation of the counting device, the reset wheels will rotate in a clockwise direction, as viewed from the handle end of my mechanism, and check wheel 42 will rotate in a counter-clockwise direction, and shaft 40 will be locked in a non-rotative relation. At this time, each of the pawls 170 within the reset wheels 94 will revolve about shaft 40 in the direction indicated by the arrow of Fig. 8, and consequently the noses of each pawl will slide over said shaft without locking in groove 167. As shown in Fig. 4, shaft 40 is provided with a reduced throat 175 of such diameter that its peripheral face lies below the bottom of groove 167. This throat normally lies in alignment with the check wheel pawl 170 during the operation of the counter so that the nose portion of said pawl will be free to slide over the peripheral face of portion 175 and not restrict the counting rotation of check wheel 42.

When the handle H is pushed inwardly to permit clockwise operative rotation of the reset shaft 40, each time that one of the pawls 170 drops into engagement with groove 167, the approaching shoulder 168 will positively engage the nose thereof and rotate the respective count wheels 94 as integral members with shaft 40. It will be appreciated, however, that due to the ratchet driving connection between each reset count wheel 94 and its respective driving gear which is similar to the construction illustrated in Fig. 9, the count wheels 94 may be reset to initial zero starting positions with a rotation which is not imparted to gears 103 and the driving mechanism. As illustrated in Fig. 4, when shaft 40 is in an inoperative position, groove 167 normally lies in a vertical position, and during a resetting operation the pawls 170 will be successively engaged until each of the reset wheels are rotated to the locked position of said shaft, at which time the wheels will each lie in individual zero positions.

As shown in Fig. 4, the right-hand end of reduced portion 175 of the reset shaft terminates in a tapered portion 177, and the right-hand end of bushing 109 is provided with a cut out portion 178 through which the check wheel pawl 170 freely depends. When handle H is moved inwardly to operate the reset mechanism, tapered shoulder 177 engages the inner end of pawl 170 and a portion of groove 167 engages with said pawl during the shaft rotation so that shoulder 168 will engage the pawl and cause check wheel 42 to rotate with the reset shaft 40 as shown in Fig. 5.

In view of the fact that check wheel 42 is driven through the instrumentality of clutch members 127, 125, 118, spring 142, and member 144, a stop is provided to engage a shoulder in the periphery of plate 118 and lock the check wheel at an initial zero starting position during the resetting operation and prior to the completion of the second rotation of reset shaft 40. This starting position of check wheel 42 is shown in Fig. 1, wherein an index line through "0" is in alignment with a pointer 184 fastened to bracket 33 by a screw 185. To accomplish this locking operation, I have provided a pawl 187 pivotally mounted on a stud 188 laterally projecting from the inner face of bracket 33 and having a nose portion 189 engageable within a depression 190 against a shoulder 191 cut substantially radially within flange 118. The opposed edge of nose 189 is tapered as shown and arranged to engage a tapering surface within flange 118 so that counter-clockwise operative registration of check wheel 42 will not be hindered but will cause said nose to slide out of the depression. Pawl 187 is resiliently urged into a sliding engagement with the peripheral face of plate 118 by means of a spring 200 which, in the present instance, is wound around pin 188 and resiliently engages the pawl at one end and the top face of base 21. Hence, it will be appreciated that during the resetting operation each of the count wheels is moved to an initial zero position, and at the same time check wheel 42 is moved in a clockwise or reversed direction from that of its operative rotation to an initial zero position and restrained against further resetting movement by means of pawl 187. This check wheel resetting movement and further operative movement of shaft 40 relative to check wheel 42 will cause a slippage of the clutches associated therewith and tend to rotate the driving mechanism in a reversed direction to its operative movement in order to prevent the introduction of backlash in the driving mechanism so that the next initial movement of the driving mechanism will accurately register in a corresponding rotation of check wheel 42. It will be seen that during the registering operation, the forward faces of the teeth of each gear in the driving train will engage the rear faces of the teeth of the next succeeding gear, and during the resetting operation, due to the arrangement described and the fact that the check wheel is turned in a direction opposite to that in which it rotates during the registering operation, this same engagement of the faces of the teeth is maintained so that there is no lost motion, and backlash is avoided.

In order to insure that all of the numeral wheels of the counter A are properly picked up by the reset shaft and all of the wheels are properly returned to initial zero position, the arrangement is such that the reset shaft 40 must be rotated through two revolutions on each resetting operation. To this end, I have provided an arrangement for preventing the reset shaft 40 from moving to the right under the influence of the spring 150 after the reset shaft has made one revolution and at which time the notch or cut-out portion 155 of the locking plate 151 is in registry with the pin 157. This arrangement includes an outwardly extending arm or cam 208 secured to the hub 162 which, as previously stated, is fixed to the left hand end of the reset shaft and carries the pinion or gear 160. This gear meshes with a gear 211 journaled on the left hand end of the jack shaft 65. The gear 211 makes one revolution while the gear 160 makes two revolutions. Extending from the face of the gear 211 is a pin 210 which is so positioned that, at the termination of the first complete revolution of the reset shaft, the pin will be positioned behind the arm 208 and thus prevent the reset shaft from moving to the right as it could otherwise do. It will be seen that when it is desired to reset the check wheel and the wheels of the register A, the handle H is pushed in, thereby moving the reset shaft to the left and disengaging the disk 151 from the pin 157. The shaft is then turned two complete revolutions in a clockwise direction, as viewed from the right hand end of the machine. During the resetting operation, the cooperating pin 157 and disk 151 will prevent the shaft from moving to the right under the influence of the spring 150 except at the completion of the first revolution but at that time the shaft is prevented from moving to the right because the pin 210 lies behind, that is, to the right, of the arm 208 carried by the left hand end of the reset shaft. At the completion of the resetting operation, the notch 155 of the disk 151 is in registry with the pin 157 and the pin 210 is remote from the arm 208 so that the spring 150 may now urge the reset shaft to the inoperative position as shown in the drawings. In order to aid in disengagement of the disk 151 from the pin on initial rotation of the reset shaft, one side of the cut-out portion 155 has an inwardly projecting tapered portion 166.

In view of the fact that the resetting pawls are only engaged when the shaft 40 is rotated in a clockwise direction, I have provided a keyway 201 within the outer end of hub 162, and a spring-pressed pawl 203 journalled on a laterally projecting pin 204 secured to the side face of bracket 32 is urged into peripheral engagement with hub 162 and keyway 201 by a coiled spring 206 wound upon pin 204. It will be appreciated by observing Fig. 2 that a counter-clockwise rotation of shaft 40, as viewed from the handle end of shaft 40, will be prevented due to the fact that pawl 203 will engage the side of keyway 201 and prevent further reversed rotation of the reset mechanism in a non-operative direction.

In the event that the first clockwise rotation of the resetting handle H should bring the reset count wheels to apparently initial positions, I have further provided a device which makes it necessary for the operator to complete the resetting operation. To accomplish this, I have provided a pivotally movable bar or shutter 215 arranged to be automatically moved over the registering numerals of the count wheels during the resetting operation so that they cannot be observed until after the resetting operation has been completed. This bar preferably comprises a member made from a flat metallic strip having two opposed downwardly depending side arms 216 and 217 pivoted on two laterally disposed pins, one of which is shown at 219.

As shown in Fig. 2, the bar 215 is normally held in its downwardly located position by means of a coiled spring 220 secured to said member at one end and secured at the other end to a stud 222 mounted in base 21. As further shown in Fig. 2, the inner side of gear 211 has a cam plate 225 secured thereto for integral rotation therewith. This plate has a substantially cylindrical peripheral surface 226 interrupted at one point by an arcuate cut out portion 227 arranged to periodically engage a laterally extending pin 228 projecting from the rearward portion of arm 216. The enmeshed gears 160 and 211 are preferably of such size that gear 160 must be rotated through two complete revolutions to cause one rotation of gear 211, and slot 227 is so positioned as to lie in engagement with pin 228 during normal operation of the counting mechanism when reset handle H is locked in an inoperative position, as shown in Fig. 1. It will thus be appreciated that at the start of the resetting operation the rotational movement of cam 225 will move pin 228 out of slot 227 and into peripheral engagement with surface 226, thereby causing bar 215 to swing upwardly upon its pivotal supports and cover the registering numerals of the reset count wheels and check wheel 42. Bar 215 will remain in this position until completion of the resetting operation at which time pin 228 will again be received within cut out portion 227, and spring 220 will return said bar to its inoperative position (Fig. 2) at which point the count wheels may again be observed through a suitable window 230 in the top of cover 28.

It is frequently convenient to provide a counting mechanism wherein the totalizer may only be observed when desired. To accomplish this purpose, I have provided a further shutter 231 which may be moved into such positions that the registering numerals on the totalizer B may or may not be visible, as desired, through a suitably located window 233 in cover 28. Bar shutter 231 is provided with two laterally extending portions 234 and 235 journalled at their inner ends for free pivotal movement on totalizer shaft 37. A laterally extending pin 236 projects outwardly from arm 234 and lies in the path of a rotatable arm 238 mounted for suitable movement with a rotatable head 239. Head 239 preferably comprises a portion of a lock of a familiar drum type mounted for rotation within the end of casing 28 and actuated by a suitable key received in a slot therein. In view of the fact that the key and lock may be of any familiar and well-known construction, it is not deemed necessary to illustrate them herein in detail. Rotary movement of the key within said lock is arranged to cause a pivotal swinging movement of arm 238 so that it will engage lateral pin 236 on either side and swing bar 231 into or out of alignment with window 233, whereby the figures upon the count wheels therebeneath may be visible or obscured from visibility under control of the holder of the key. In Fig. 2, the arm 234 is shown by dotted lines in the position which it assumes when it has moved the shutter into concealing position with respect to the numeral wheels of the register B. If it is desired to move the shutter 231 upwardly and rearwardly to inoperative position, the barrel or drum 239 is rotated by means of a key counter-clockwise with respect to Fig. 2 through slightly more than one complete revolution so that the rear edge of the arm 234 will engage the front portion of the pin 236 and move the same into engagement with the shoulder 241. Bracket 32 is further provided with an arcuate cut away portion 240 terminating in shoulders 241 and 242 which suitably limit the extent of pivotal movement of bar 231 with reference to window 233.

In view of the fact that many changes could be made in the above construction and many apparently different embodiments of this invention could be made without departing from the scope thereof, it is intended that all matter contained in the above description or shown in the accompanying drawings shall be interpreted in an illustrative and not in a limiting sense.

It is also to be understood that the language employed in the following claims is intended to cover all of the generic and specific features of the invention herein described and all statements of the scope of the invention which, as a matter of language, might be said to fall therebetween.

I claim as my invention:

1. A counting device comprising a resetting shaft, a counting wheel rotatable thereon to produce a counting operation, driving mechanism including a clutch connected to rotate said wheel in one direction, means to rotate said shaft and rotate said wheel in an opposite direction whereby the clutch will be caused to slip and all lost motion of the driving mechanism will be avoided while the count wheel is being reset to an initial zero position.

2. In a resettable counting device having a counting wheel mounted for free rotation upon a reset shaft during a counting operation, driving mechanism including a friction clutch arranged to rotate the count wheel and cause a counting operation, means to connect said shaft with the counting wheel and rotate said wheel backwardly causing a slippage of the clutch, and means to stop further resetting movement of the counting wheel when it reaches an initial zero starting position during the resetting operation.

3. A counting device comprising a resetting shaft, a counting wheel rotatably mounted thereon, driving mechanism arranged to rotate the wheel in one direction and cause a counting registration, a frictional clutch in the driving mechanism arranged to transmit rotation to the counting wheel and a frictional clutch connectable between the count wheel and the reset shaft during a resetting operation, manually operable means arranged to rotate the reset shaft in a direction opposite to that of count wheel registration and engage said second mentioned clutch to rotate the count wheel backwardly causing a slippage of said first mentioned clutch, and means engageable with the count wheel to stop its rotation and cause slippage of said second clutch during the resetting of said wheel and until the termination of the resetting operation.

4. In combination with a counting device including a series of denominational order wheels arranged to perform a consecutive counting operation, a resetting shaft supporting the wheels and arranged to reset them to zero positions, a check wheel rotatably mounted on said shaft, driving mechanism connected to rotate the wheel of lowest order and the check wheel in predetermined rotational relation but in opposite directions, and cause a counting operation, a friction driving clutch between the check wheel and driving mechanism, and a friction driving clutch connectable between the check wheel and reset shaft during a resetting operation, means to rotate the resetting shaft and engage said second named clutch to cause a resetting movement of the check wheel and a slippage of said first mentioned clutch whereby the check wheel may be reset to an initial zero position.

5. A counting device comprising a frame, a resetting shaft slidably and rotatably mounted therein, a counting wheel on said shaft, driving mechanism including a frictional connection arranged to rotate the wheel forwardly and cause a counting operation, means to slidably shift the shaft into driving engagement with the count wheel and rotate said wheel therewith in a backward resetting direction to a zero position, said resetting operation causing a slippage of the frictional connection means normally locking the shaft against rotation, means associated with the resetting mechanism necessitating that the shaft be rotated through two complete rotations during the resetting operation, and a member resiliently urged into engagement with the count wheel which stops its rotation at its zero position during resetting and prior to completion of the shaft rotation.

6. In combination with a resetting mechanism for a counting device having a plurality of counting wheels mounted on a reset shaft, spaced frame members rotatably and slidably supporting the shaft, means engageable with said shaft to rotate it and cause a resetting operation, mechanism including a spring-pressed plate secured to one end of the shaft and locking it against rotation during on operative registration of the count wheels, a protecting cover secured to the frame, said cover having a pin laterally projecting therefrom and arranged to receive the spring-pressed plate in locking engagement therewith during operation of the counting mechanism, said pin also serving to slidably and frictionally engage the spring-pressed plate to maintain shaft in resetting position during a major portion of the resetting operation, a cam plate secured at the other end of the shaft and cooperable with a movable member to maintain said shaft and plate in their resetting positions at the completion of the first rotation of said shaft during the resetting operation, said members being remote from each other at the completion of the second rotation of the shaft whereby the plate and shaft may again engage into locked operative position at the completion of the resetting operation.

7. In a counting device, a slidably and rotatably supported reset shaft, a groove in said shaft terminating in a reduced cylindrical shaft portion provided with a tapering face adjacent to the groove, a sleeve mounted for rotation on said shaft and having a driving gear journalled on one end thereof, the other end of said sleeve overhanging the reduced portion, a count wheel journalled on said sleeve and connectable with the gear through a friction clutch, a device connectable between the count wheel and the reset shaft only during a resetting operation, said device including a spring-pressed member which is normally slidably engaged with the reduced cylindrical portion, and means to axially shift and rotate said shaft whereby the tapering face will guide the spring-pressed member into locking engagement with the groove and transmit the shaft rotation to reset said count wheel.

8. In a counting device having a slidably mounted rotatable reset shaft, a longitudinally disposed groove in said shaft, a sleeve rotatably mounted on the shaft having a driving gear journalled on one end thereof, a counting wheel journalled on the sleeve and connected to the gear by a frictional clutch, a second frictional clutch including a driven plate secured to the count wheel and a driving plate secured to the sleeve for integral rotation therewith, said driving plate having a spring-pressed member engageable with the reset shaft, said shaft having a reduced portion slidably engageable with said member during a counting operation, and means to slidably shift and rotate the reset shaft whereby the spring-pressed member will lock within the longitudinal groove and the counting wheel will be integrally rotated with the shaft.

9. In a counting device, a slidably and rotatably supported reset shaft, a groove in said shaft terminating in a reduced cylindrical portion intermediate of the shaft ends, a sleeve journalled on said shaft and overhanging the reduced portion, a driving gear journalled on the sleeve, said gear having a clutch facing frictionally engageable with a resilient clutch member slidably secured for integral rotation with the sleeve and frictionally engaged with a count wheel journalled on the sleeve, a second clutch having a driven plate fastened to the count wheel and a driving plate integrally secured to the sleeve substantially in alignment with the reduced shaft portion, a pawl within said driving member, an aperture within said sleeve through which said pawl extends into sliding engagement with the reduced shaft portion during rotation of the gear, and manually operable means to slidably move said shaft and rotate it whereby the pawl will be positively engaged by the groove and the count wheel may be rotated through the instrumentality of said second mentioned clutch to an initial starting position without transmitting rotation to the driving gear.

10. A counting device comprising a rotatable counting wheel, means supporting the wheel, driving mechanism including a frictional driving connection arranged to rotate said wheel in one direction and cause a counting operation, means to rotate the wheel in an opposite direction to reset it to an initial zero position, said frictional connection being arranged to slip during a resetting operation and preventing backlash in the driving mechanism prior to the next counting operation.

11. A counting device comprising a resetting shaft, a counting wheel rotatably mounted thereon, driving mechanism including a friction clutch arranged to rotate said wheel in one direction and cause a counting operation, means to rotate said shaft and counting wheel in the opposite direction to reset said wheel to initial zero position causing a slippage of the clutch and automatically preventing backlash within the driving mechanism during the resetting operation whereby the next initial movement of the driving mechanism will result in an accurate registration of the count wheel.

12. A counting device comprising a resetting shaft, a counting wheel rotatably mounted thereon, driving mechanism arranged to rotate said wheel in one direction to cause a counting operation, means to rotate said shaft and counting wheel in the opposite direction to reset the wheel to an initial zero position, said driving mechanism including means which imparts an operative movement to the count wheel during the counting operation and which permits a reversed rotation of the wheel and tends to urge the driving mechanism in an opposite direction to its normal operating movement during a resetting operation, whereby the backlash of the parts of the driving mechanism is prevented during a resetting operation so that the next initial operative movement of the driving mechanism will result in an accurate registration of the count wheel.

13. In a counting device having a series of resettable count wheels, a resetting shaft therefor, a check wheel rotatably mounted on said shaft, driving mechanism arranged to simultaneously rotate the count wheels and check wheel in opposite directions and in predetermined rotational relationship, said driving mechanism including a friction clutch connected to the check wheel, means to reset said wheels to initial zero starting positions causing a reversed rotation of the check wheel, said clutch imparting a forward operative movement to the check wheel during a counting operation and permitting a reversed rotation of the check wheel during a resetting operation and frictionally urging a reversed movement of the driving mechanism during resetting whereby all of the lost motion will be prevented in the driving mechanism prior to the next initial movement of said mechanism causing an accurate registration of the check wheel at the start of each counting operation.

14. In a counting device having a series of denominational order wheels arranged to preform a consecutive counting operation, a reset shaft supporting said wheels, a check wheel rotatably mounted on the shaft, driving mechanism arranged to rotate the wheel of lowest order and the check wheel in opposite but registering directions and in predetermined rotational relation to each other, means to rotate the reset shaft in a direction opposite to that of the check wheel registration to reset all of the wheels to initial positions, means automatically disengaging the denominational order wheels from the driving mechanism during a resetting rotation of said order wheels, and means automatically engageable with the check wheel to stop its resetting operation at its zero position.

15. A counting device comprising a rotatable counting wheel, means supporting said wheel, driving means including a frictional driving connection arranged to rotate said wheel in one direction and cause a counting operation, means to rotate the wheel in an opposite direction to reset it to an initial zero position, said frictional connection being arranged to slip during a resetting operation, and means to stop further resetting movement of the counting wheel when it reaches an initial zero starting position during the resetting operation.

16. A counting device comprising a plurality of denominational order wheels, a counting wheel of lower denominational order than the wheel of lowest order of said first mentioned wheels, means rotatably supporting all of said wheels, driving mechanism arranged to rotate said first mentioned wheels and said counting wheel during registering, and resetting means to rotate the first mentioned wheels in the direction in which they are rotated during registering and to rotate said counting wheel in a direction opposite to that in which it is rotated during registering so as to reset all of the wheels to initial zero position, said driving mechanism including a frictional driving connection leading to said counting wheel and arranged to slip during a resetting operation.

17. A counting device comprising a plurality of denominational order wheels, a counting wheel of lower denominational order than the wheel of lowest order of said first mentioned wheels, means rotatably supporting all of said wheels, driving mechanism arranged to rotate said first mentioned wheels and said counting wheel during registering, resetting means to rotate the first mentioned wheels in the direction in which they are rotated during registering and to rotate said counting wheel in a direction opposite to that in which it is rotated during registering so as to reset all of the wheels to initial zero position, said driving mechanism including a frictional driving connection leading to said counting wheel and arranged to slip during a resetting operation, means to stop further resetting movement of said counting wheel when it reaches an initial zero starting position during the resetting operation, and means to stop further resetting movement of the first mentioned wheels when they reach an initial zero starting position during the resetting operation.

HARVEY L. SPAUNBURG.